US012591104B2

(12) United States Patent
Xu et al.

(10) Patent No.: US 12,591,104 B2
(45) Date of Patent: Mar. 31, 2026

(54) LENS MODULE AND ELECTRONIC DEVICE HAVING BEARING STRUCTURE WITH BENT PORTION

(71) Applicant: Changzhou AAC Raytech Optronics Co., Ltd., Changzhou City (CN)

(72) Inventors: Tongming Xu, Changzhou (CN); Suohe Wei, Changzhou (CN); Limei Zhao, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 348 days.

(21) Appl. No.: 18/540,936

(22) Filed: Dec. 15, 2023

(65) Prior Publication Data

US 2024/0337810 A1      Oct. 10, 2024

Related U.S. Application Data

(63) Continuation of application No. PCT/CN2023/086089, filed on Apr. 4, 2023.

(51) Int. Cl.
| | |
|---|---|
| *G02B 7/04* | (2021.01) |
| *G02B 7/08* | (2021.01) |
| *G02B 27/64* | (2006.01) |
| *H04N 23/68* | (2023.01) |

(52) U.S. Cl.
CPC ................. *G02B 7/04* (2013.01); *G02B 7/08* (2013.01); *G02B 27/646* (2013.01); *G03B 2205/0015* (2013.01); *H04N 23/687* (2023.01)

(58) Field of Classification Search
CPC ... G02B 7/02; G02B 7/04; G02B 7/08; G02B 27/646; G03B 2205/0015; H04N 23/687
See application file for complete search history.

(56) References Cited

U.S. PATENT DOCUMENTS 10,281,691 B2 * 5/2019 Sugawara ............ G02B 13/005

* cited by examiner

*Primary Examiner* — Ryan S Dunning
(74) *Attorney, Agent, or Firm* — Wiersch Law Group

(57) ABSTRACT

The disclosure relates to the technical field of optical systems, and relates to a lens module and an electronic device. The lens module includes a bearing structure, a support frame, a lens barrel, and an adjusting mechanism. The bearing structure includes an upper shell and a base that are connected with each other. In the lens module of the present embodiment, by adopting a bent portion spaced apart from the side wall to cooperate with the focus coil, the internal space of the upper shell can be fully utilized to make the structure between the focus assembly and the upper shell more compact, thereby making the overall structure of the lens module more compact.

20 Claims, 6 Drawing Sheets

10

A-A

B

C

LENS MODULE AND ELECTRONIC DEVICE HAVING BEARING STRUCTURE WITH BENT PORTION

CROSS REFERENCE TO RELATED APPLICATIONS

The present application is a continuation of PCT Patent Application No. PCT/CN2023/086089, filed Apr. 4, 2023, which is incorporated by reference herein in its entirety.

TECHNICAL FIELD

The various embodiments described in this document relate in general to the technical field of optical systems, and more specifically to a lens module and an electronic device.

BACKGROUND

With the development of camera technologies, lens modules with auto focus (AF) and optical image stabilizer (OIS) have been widely used in electronic devices, such as tablet computers and smart phones.

In the traditional lens module, the AF and OIS function are generally achieved through separate coils and magnets. In practical applications, there is a need to use the combination of multiple coils and multiple magnets in the lens module, which requires a large number of parts, and thus leads to the increase of the volume and weight of the whole module. When applied to electronic devices, the lens module may lead to the increase of the volume of the electronic device. In addition, when multiple parts are installed on the movable members, the overall mass of the movable members may increase, which may directly affect the accuracy and stability of focus and anti-shaking, thereby directly affecting the performance of the lens module.

Therefore, it is necessary to miniaturize the lens module on the premise that the functionality of the lens module is ensured.

SUMMARY

The present disclosure provides a lens module and an electronic device for solving the problem of increasing the volume and mass of an existing lens module due to a large number of parts in the lens module, which leads to an increase in the overall volume of the electronic device as well as an impact on the performance of the lens module.

In some embodiments, a lens module is provided. The lens module includes a bearing structure including an upper shell and a base that are connected with each other, where the upper shell includes a bent portion, a middle portion, and a side wall that are connected in sequence, where the side wall is spaced apart from the bent portion, and the base is configured to be electrically connected with an external circuit; a support frame suspended inside the bearing structure; a lens barrel suspended inside the support frame; and an adjusting mechanism including a focus assembly, an anti-shake assembly, and a reset assembly, where the focus assembly includes a focus coil and at least one focus magnet, the focus coil is wound on the lens barrel and suspended between the bent portion and the side wall, and a respective focus magnet of the at least one focus magnet is at least partially arranged on a side of the side wall facing the focus coil, where the anti-shake assembly is connected to the base and the support frame, and the reset assembly is connected to the bearing structure, the support frame, and the lens barrel, and is electrically connected to the focus assembly and the anti-shake assembly.

In some embodiments, the reset assembly includes a first reset member, the first reset member includes a flexible structure and a suspension wire, the flexible structure is connected to the lens barrel and the support frame, and the support frame is electrically connected to the focus coil and the anti-shake assembly, where the suspension wire is connected with the flexible structure and the base, and the suspension wire is electrically connected with the base.

In some embodiments, the flexible structure includes at least one first flexible arm and at least two first connecting portions, where the two first connecting portions are respectively connected to the lens barrel and the support frame, each of the at least one first flexible arm is connected to the at least two first connecting portions, and the suspension wire has an end connected and electrically connected with one of the at least two first connecting portions and has another end connected and electrically connected with the base.

In some embodiments, the lens barrel defines at least one first avoidance groove, a respective first avoidance groove of the at least one first avoidance groove is defined on a side of the lens barrel facing a respective first flexible arm of the at least one first flexible arm, and an orthographic projection of the respective first flexible arm on the lens barrel at least partially coincides with the respective first avoidance groove; and/or the support frame defines at least one second avoidance groove, a respective second avoidance groove of the at least one second avoidance groove is arranged on a side of the support frame facing the respective first flexible arm, and an orthographic projection of the respective first flexible arm on the support frame at least partially coincides with the respective second avoidance groove.

In some embodiments, the flexible structure further comprises at least one second flexible arm and a second connecting portion, where a respective second flexible arm of the at least one second flexible arm is connected to the second connecting portion and the respective first connecting portion, and the second connecting portion is connected with an end of the suspension wire away from the base.

In some embodiments, the support frame defines at least one third avoidance groove, a respective third avoidance groove of the at least one third avoidance groove is defined on a side of the support frame facing the respective second flexible arm, and an orthographic projection of the respective second flexible arm on the support frame at least partially coincides with the respective third avoidance groove.

In some embodiments, the reset assembly further comprises a second reset member, the second reset member is connected to the lens barrel and the support frame, and the second reset member is disposed at a side of the support frame away from the first reset member.

In some embodiments, the second reset member includes a flexible connecting arm and at least two reset and fixing portions, where the at least two reset and fixing portions are respectively connected to the flexible connecting arm, where the two reset and fixing portions are respectively connected to the lens barrel and the support frame.

In some embodiments, the lens barrel defines a fourth avoidance groove, the fourth avoidance groove is defined on a side of the support frame facing the flexible connecting arm, and an orthographic projection of the flexible connecting arm on the support frame at least partially coincides with the fourth avoidance groove.

In some embodiments, the support frame defines a movable hole penetrating the support frame, the suspension wire is inserted into the movable hole and spaced apart from an inner wall of the movable hole.

In some embodiments, the first reset member further comprises a damping filler, and the damping filler fills in the movable hole and at least partially wraps the suspension wire.

In some embodiments, the frame body defines a movable cavity inside the frame body, and the lens barrel is suspended in the movable cavity, where the lens barrel defines a movable groove connecting with the movable cavity, and the bent portion is inserted into the movable groove and spaced apart from an inner wall of the movable groove.

In some embodiments, the at least one focus magnet is configured as one focus magnet, and the one focus magnet is connected to the side wall and disposed outside the focus coil; or where the at least one focus magnet is configurated as at least two focus magnets, where the two focus magnets are respectively arranged on opposite sides of the focus coil, and the two focus magnets are respectively arranged on the bent portion and the side wall.

In some embodiments, the anti-shake assembly includes at least one anti-shake coil and at least one anti-shake magnet, the base defines at least one accommodating groove, the at least one anti-shake coil is arranged at the bottom of the support frame, and a respective anti-shake magnet of the at least one anti-shake magnet is accommodated in a respective accommodating groove of the at least one accommodating groove and corresponding to a respective anti-shake coil of the at least one anti-shake coil.

In some embodiments, the adjusting mechanism further comprises a position sensing assembly, the position sensing assembly is electrically connected to the base, and the position sensing assembly is configured to obtain a relative position between the lens barrel and the support frame.

In some embodiments, the position sensing assembly includes a sensing magnet and a magnetic sensor, and the sensing magnet is magnetically cooperated with the magnetic sensor, where one of the sensing magnet and the magnetic sensor is disposed on the lens barrel, and another of the sensing magnet and the magnetic sensor is disposed on the support frame.

In some embodiments, the lens barrel defines at least one mounting slot on an outer circumferential wall of the lens barrel, the focus coil is wound on the lens barrel and accommodated in the mounting slot, and the mounting slot is at least partially located between the bent portion and the side wall.

In some embodiments, an electronic device is provided. The electronic device includes a host device and the lens module described in any aspect of the disclosure. The lens module is arranged in the host device.

Implementing the technical solution of the disclosure has following technical advantages.

In the lens module of the present embodiment, by using the bent portion spaced apart from the side wall to cooperate with the focus coil, an internal space of the upper shell can be fully utilized to make the structure between the focus assembly and the upper shell more compact, thereby making the overall structure of the lens module more compact and facilitating arrangement of the lens module in an electronic device. In addition, the power supply and signal transmission functions of the lens module can be realized by enabling the reset assembly to be electrically connected to the focus assembly and the anti-shake assembly, and the purpose of optimizing the internal structure of the lens module can be further achieved.

BRIEF DESCRIPTION OF THE DRAWINGS

In order to explain more clearly the embodiments of the disclosure or the technical aspects of the related technologies, the drawings required to be used in the description of the embodiments or related technologies will be briefly described below. It will be obvious that the drawings described below are only some embodiments of the disclosure, and other drawings may be obtained from these drawings without creative effort for those of ordinary skill in the art.

SYMBOL DESCRIPTION

Figure 1:
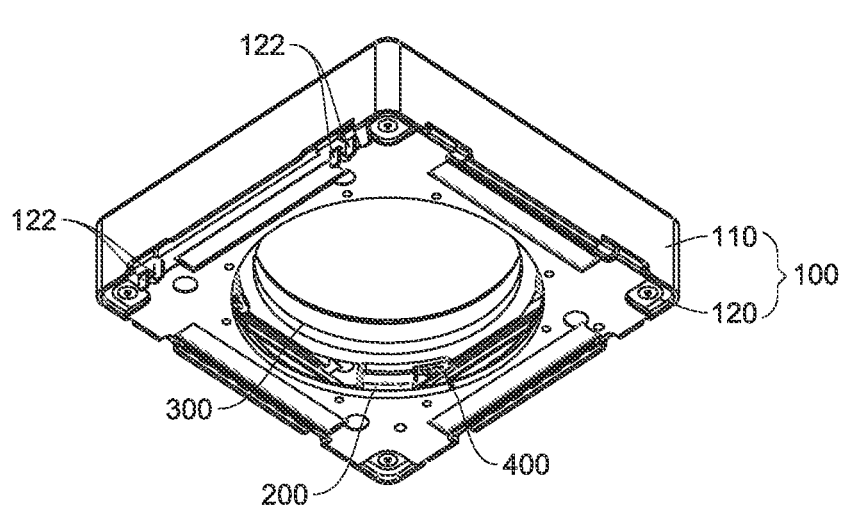
FIG. 1 is a perspective view of a lens module according to an embodiment of the present disclosure.

10: lens module
100: bearing structure; 110: upper shell; 111: bent portion; 112: middle portion; 113: side wall; 120: base; 121: accommodating groove; 122: base insert
200: support frame; 210: frame body; 211: movable hole; 212: second avoidance groove; 213: third avoidance groove; 214: movable cavity; 220: frame insert; 221: insert connecting part; 222: insert fixing part; 223: insert middle part; 230: fixing column
300: lens barrel; 310: mounting slot; 320: first avoidance groove; 330: fourth avoidance groove; 340: movable groove
400: adjusting mechanism; 410: focus assembly; 411: focus coil; 412: focus magnet; 413: focus circuit board; 420: anti-shake assembly; 421: anti-shake coil; 422: anti-shake magnet; 423: anti-shake circuit board; 430: reset assembly; 431: first reset member; 4311: flexible structure; 43111: first flexible arm; 43112: first connecting portion; 43113: second flexible arm; 43114: second connecting portion; 4312: suspension wire; 4313: damping filler; 432: second reset member; 4321: flexible connecting arm; 4322: reset and fixing portion; 440: position sensing assembly; 441: sensing magnet; 442: magnetic sensor

DETAILED DESCRIPTION OF THE EMBODIMENTS

In order to make the objects, technical aspects, and advantages of the present disclosure clearer, the technical aspects of the present disclosure will be clearly and completely described below in conjunction with the accompanying drawings therein, and it will be apparent that the described embodiments are part of and not all the embodiments of the present disclosure. Based on the embodiments in the present disclosure, all other embodiments obtained without creative effort by those of ordinary skill in the art fall within the scope of protection of the present disclosure.

Referring to FIGS. 1 to 8, embodiments of the present disclosure provide a lens module 10. The lens module 10 includes a bearing structure 100, a support frame 200, a lens barrel 300, and an adjusting mechanism 400. The bearing structure 100 includes an upper shell 110 and a base 120 that are connected with each other. The upper shell 110 includes a bent portion 111, a middle portion 112, and a side wall 113 that are connected in sequence, where the side wall 113 is spaced apart from the bent portion 111. The base 120 is configured to be electrically connected with an external circuit. The support frame 200 is suspended inside the bearing structure 100. The lens barrel 300 is suspended inside the support frame 200. The adjusting mechanism 400 includes a focus assembly 410, an anti-shake assembly 420, and a reset assembly 430. The focus assembly 410 includes a focus coil 411 and at least one focus magnet 412. The focus coil 411 is wound around the lens barrel 300 and suspended between the bent portion 111 and the side wall 113. Each of the at least one focus magnet 412 is at least partially arranged on a side of the side wall 113 facing the focus coil 411. The anti-shake assembly 420 is connected to the base 120 and the support frame 200 and the reset assembly 430 is connected to the bearing structure 100, the support frame 200, and the lens barrel 300. The reset assembly 430 is electrically connected with the focus assembly 410 and the anti-shake assembly 420.

In the lens module 10 of the present embodiment, by using the bent portion 111 spaced apart from the side wall 113 to cooperate with the focus coil 411, an internal space of the upper shell 110 can be fully utilized to make the structure between the focus assembly 410 and the upper shell 110 more compact, thereby making the overall structure of the lens module 10 more compact and facilitating arrangement of the lens module 10 in an electronic device. In addition, the power supply and signal transmission functions of the lens module 10 can be realized by enabling the reset assembly 430 to be electrically connected to the focus assembly 410 and the anti-shake assembly 420, and the purpose of optimizing the internal structure of the lens module 10 can be further achieved.

Figures 2, 3:
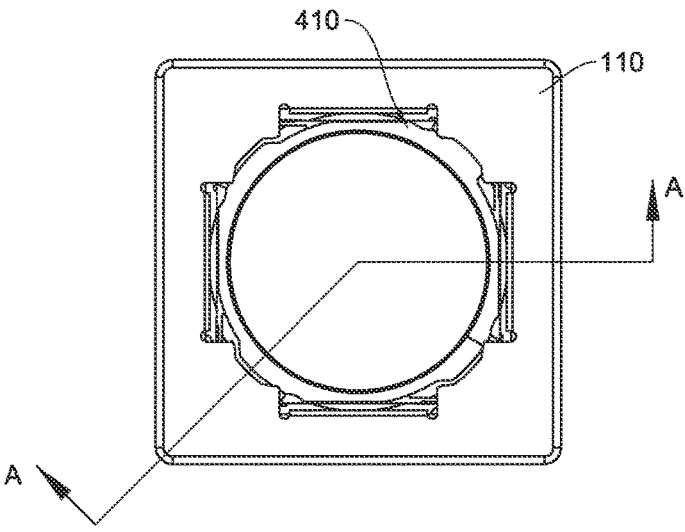
FIG. 2 is a top view of a lens module according to an embodiment of the present disclosure.
FIG. 3 is a sectional view of the lens module along line A-A in FIG. 2.
Figure 8:
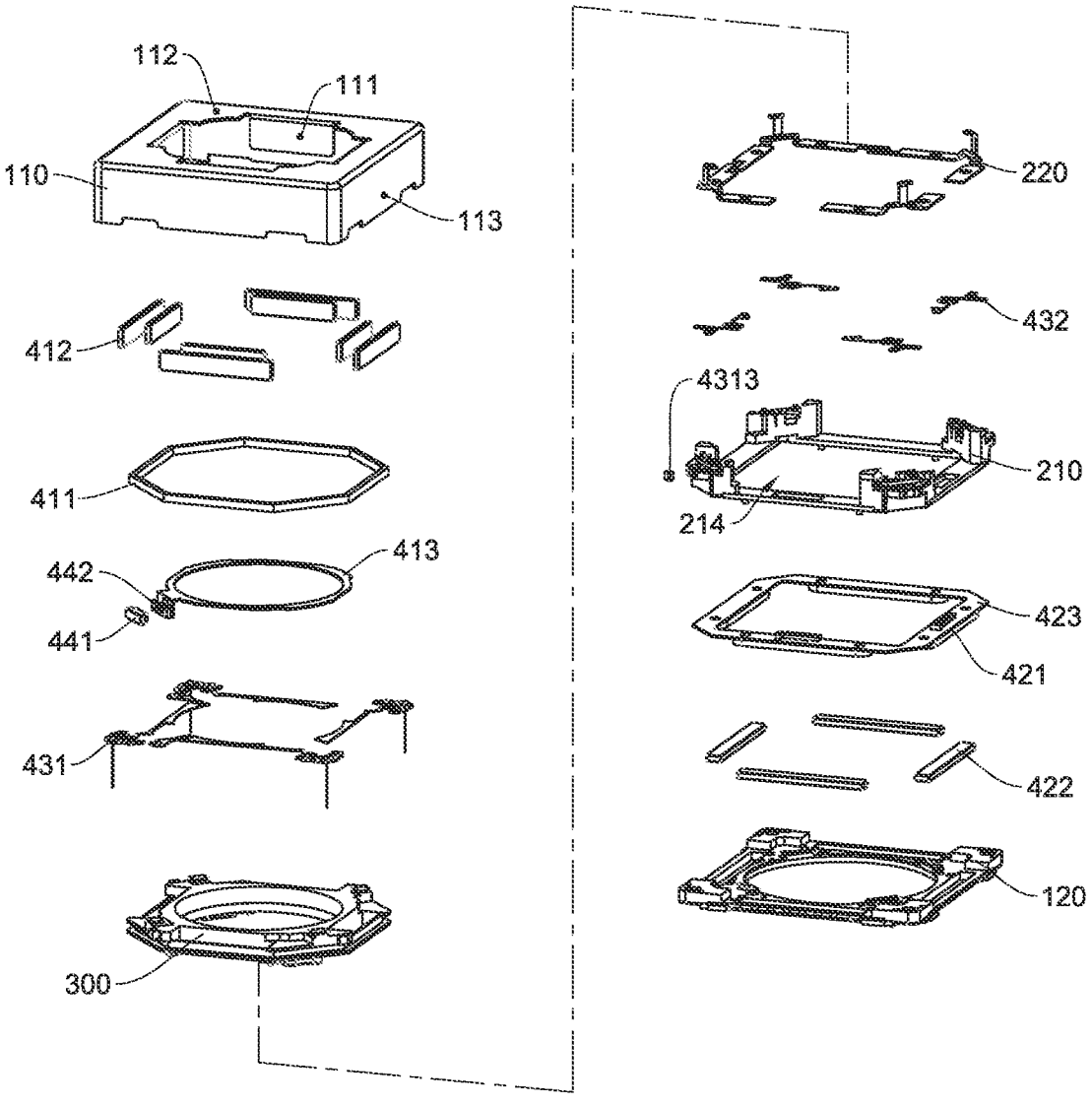
FIG. 8 is an explosion view of a lens module according to an embodiment of the present disclosure.

Referring to FIG. 1, FIG. 3, and FIG. 8, in an embodiment, the base 120 is embedded with base inserts 122 inside the base 120, and the support frame 200 includes a frame body 210 and frame inserts 220. By embedding the base inserts 122 inside the base 120 to connect with the reset assembly 430, and by connecting with the anti-shake assembly 420 and the reset assembly 430 respectively through the frame inserts 220 embedded in the frame body 210, the circuit conduction between the anti-shake assembly 420 and the focus assembly 410 can be realized, and the overall strength of the base 120 and the support frame 200 can be improved, and the overall structure of the base 120 and the support frame 200 can be made more compact. In other embodiments, the lead function of the base 120 and the support frame 200 may be realized by means of external wiring, laser direct structuring (LDS) technology, etc., which is not only limited herein.

Specifically, the focus assembly 410 further includes a focus circuit board 413. The focus circuit board 413 is electrically connected to the reset assembly 430, and the focus coil 411 is connected to the focus circuit board 413. In the present embodiment, the anti-shake assembly 420 further includes an anti-shake circuit board 423, preferably, a flexible printed circuit (FPC), so that the anti-shake circuit board 423 has a smaller thickness, through which the anti-shake circuit board 423 is electrically connected to the reset assembly 430 to achieve a lead function.

Specifically, as shown in FIGS. 2 to 6 and 8, the reset assembly 430 includes a first reset member 431. The first reset member 431 includes a flexible structure 4311 and a suspension wire 4312. The flexible structure 4311 is connected to the lens barrel 300 and the support frame 200. The support frame 200 is electrically connected with the focus coil 411 and the anti-shake assembly 420. The suspension wire 4312 is connected to the flexible structure 4311 and the base 120, and the suspension wire 4312 is electrically connected with the base 120.

By connecting the flexible structure 4311 with the suspension wire 4312 to form the first reset member 431, when the lens barrel 300 is driven to move relative to the support frame 200 by the anti-shake coil 421, the flexible structure 4311 can be deformed and can drive the lens barrel 300 to reset. By connecting the suspension wire 4312 with the support frame 200, the structure of the first reset member 431 and the support frame 200 can be made more compact, thereby making the overall structure of the lens module 10 compact.

Figure 5:
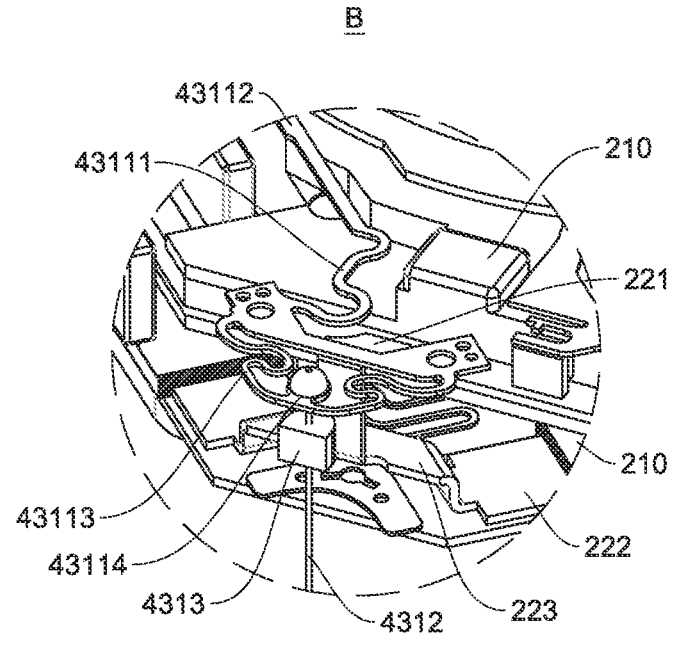
FIG. 5 is an enlarged view of part B of FIG. 4.

Specifically, as shown in FIG. 5, the flexible structure 4311 includes at least one first flexible arm 43111 and at least two first connecting portions 43112. The two first connecting portions 43112 are respectively connected to the lens barrel 300 and the support frame 200. Each of the at least one first flexible arm 43111 is connected to a plurality of first connecting portions 43112 of the at least two first connecting portions 43112. The suspension wire 4312 has an end connected and electrically connected to one of the at least two first connecting portions 43112 and has another end connected and electrically connected with the base 120.

In this embodiment, the end of the suspension wire 4312 can be welded and fixed with the first connecting portion 43112, and a certain amount of solder is preferably covered at a joint between the suspension wire 4312 and the first connecting portion 43112, so as to improve the fixing firmness between the suspension wire 4312 and the first connecting portion 43112. When the lens barrel 300 moves relative to the support frame 200, the first flexible arm 43111 can deform and store elastic potential energy. When the driving force of the anti-shake assembly 420 is removed or the elastic force of the first flexible arm 43111 overcomes the force generated by the electronic device due to shaking, the at least one first flexible arm 43111 can achieve the purpose of driving the lens barrel 300 to reset. When there are a plurality of first flexible arms 43111, each of the plurality of first flexible arms 43111 is connected to the two first connecting portions 43112, the elastic acting force of the first flexible arms 43111 can be increased, thereby improving the reset effect of the flexible structure 4311. As shown in FIG. 5, in the preferred embodiment, an extension path of each first flexible arm 43111 is preferably a curved surrounding structure to improve the deformation range and reset effect of the first flexible arm 43111. Specifically, there may be other numbers of first reset members 431, such as two first reset members 431, three first reset members 431, or four or more first reset members 431. The plurality of first reset members 431 are uniformly arranged along a circumferential direction of the lens barrel 300. The anti-shake effect and the reset stability of the anti-shake assembly 420 can be improved by providing the plurality of first reset members 431 connected to the lens barrel 300.

Furthermore, the lens barrel 300 defines at least one first avoidance groove 320. A respective first avoidance groove 320 of the at least one first avoidance groove 320 is defined on a side of the lens barrel 300 facing a respective first flexible arm 43111. An orthographic projection of the respective first flexible arm 43111 on the lens barrel 300 at least partially coincides with the respective first avoidance groove 320.

In this embodiment, by defining the first avoidance groove 320 on the lens barrel 300 to cooperate with the flexible structure 4311, when the lens barrel 300 moves and deforms relative to the support frame 200, the first avoidance groove 320 can provide an avoidance for the first flexible arm 43111, to avoid collision between the lens barrel 300 and the first reset member 431, thereby improving the durability of the first reset member 431 and making the structure between the first reset member 431 and the support frame 200 and the lens barrel 300 more compact.

In one embodiment, the support frame 200 defines at least one second avoidance groove 212. A respective second avoidance groove 212 of the at least one second avoidance groove 212 is defined on a side of the support frame 200 facing the respective first flexible arm 43111. An orthographic projection of the respective first flexible arm 43111 on the support frame 200 at least partially coincides with the respective second avoidance groove 212.

In this embodiment, by defining the second avoidance groove 212 on the support frame 200 to cooperate with the flexible structure 4311, when the lens barrel 300 moves relative to the support frame 200, the second avoidance groove 212 can provide an avoidance for the first flexible arm 43111, so as to avoid collision between the support frame 200 and the first reset member 431, thereby improving the durability of the first reset member 431 and making the structure between the first reset member 431 and the support frame 200 more compact.

Figure 6:
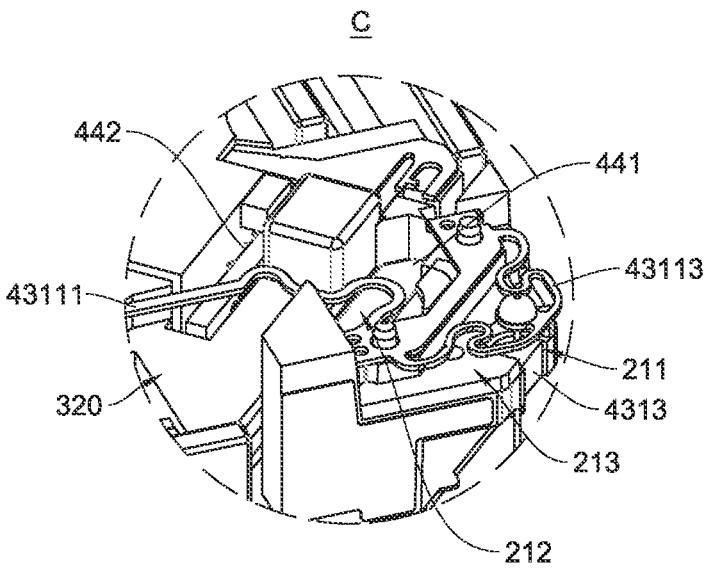
FIG. 6 is an enlarged view of part C of FIG. 4.

Furthermore, as shown in FIGS. 5 and 6, the flexible structure 4311 further includes at least one second flexible arm 43113 and a second connecting portion 43114. A respective second flexible arm 43113 of the at least one second flexible arm 43113 is connected to the second connecting portion 43114 and the respective first connecting portion 43112. The second connecting portion 43114 is connected with an end of the suspension wire 4312 away from the base 120.

In this embodiment, the end of the suspension wire 4312 and the second connecting portion 43114 are welded and fixed, and a certain amount of solder is preferably covered at a joint between the suspension wire 4312 and the second connecting portion 43114 to improve the fixing firmness between the suspension wire 4312 and the second connecting portion 43114. When the support frame 200 moves relative to the base 120, the second flexible arm 43113 can deform and store elastic potential energy. When the driving force of the anti-shake assembly 420 is removed or the elastic force of the second flexible arm 43113 overcomes the force generated by the shaking of the electronic device, the second flexible arm 43113 can realize the purpose of driving the support frame 200 to reset, thereby achieving the anti-shake function. When there are a plurality of second flexible arms 43113, each of the plurality of second flexible arms 43113 is connected to the respective first connecting portion 43112 and the second connecting portion 43114, the elastic acting force of the second flexible arms 43113 can be increased, thereby improving the reset effect of the flexible structure 4311. In the preferred embodiment, an extension path of the second flexible arm 43113 is preferably a curved surrounding structure to improve the deformation range and reset effect of the second flexible arms 43113.

Referring to FIG. 6, in one embodiment, the support frame 200 defines at least one third avoidance groove 213. A respective third avoidance groove 213 of the at least one third avoidance groove 213 is defined on a side of the support frame 200 facing the respective second flexible arm 43113. An orthographic projection of the respective second flexible arm 43113 on the support frame 200 at least partially coincides with the respective third avoidance groove 213.

In this embodiment, by defining the third avoidance groove 213 on the support frame 200 to cooperate with the flexible structure 4311, when the lens barrel 300 moves relative to the support frame 200, the third avoidance groove 213 can provide an avoidance for the second flexible arm 43113, so as to avoid collision between the support frame 200 and the first reset member 431, thereby improving the durability of the first reset member 431 and making the structure between the first reset member 431 and the support frame 200 more compact.

Furthermore, referring to FIG. 3, FIG. 5, FIG. 7, and FIG. 8, the reset assembly 430 further includes a second reset member 432 connected to the lens barrel 300 and the support frame 200. The second reset member 432 is disposed on a side of the support frame 200 away from the first reset member 431.

With such configuration, when the lens barrel 300 moves relative to the support frame 200, the lens barrel 300 and the support frame 200 are connected through the second reset member 432, the second reset member 432 can provide an elastic driving force for reset of the lens barrel 300 and can also buffer the jitter of the lens barrel 300 relative to the support frame 200.

Figure 7:
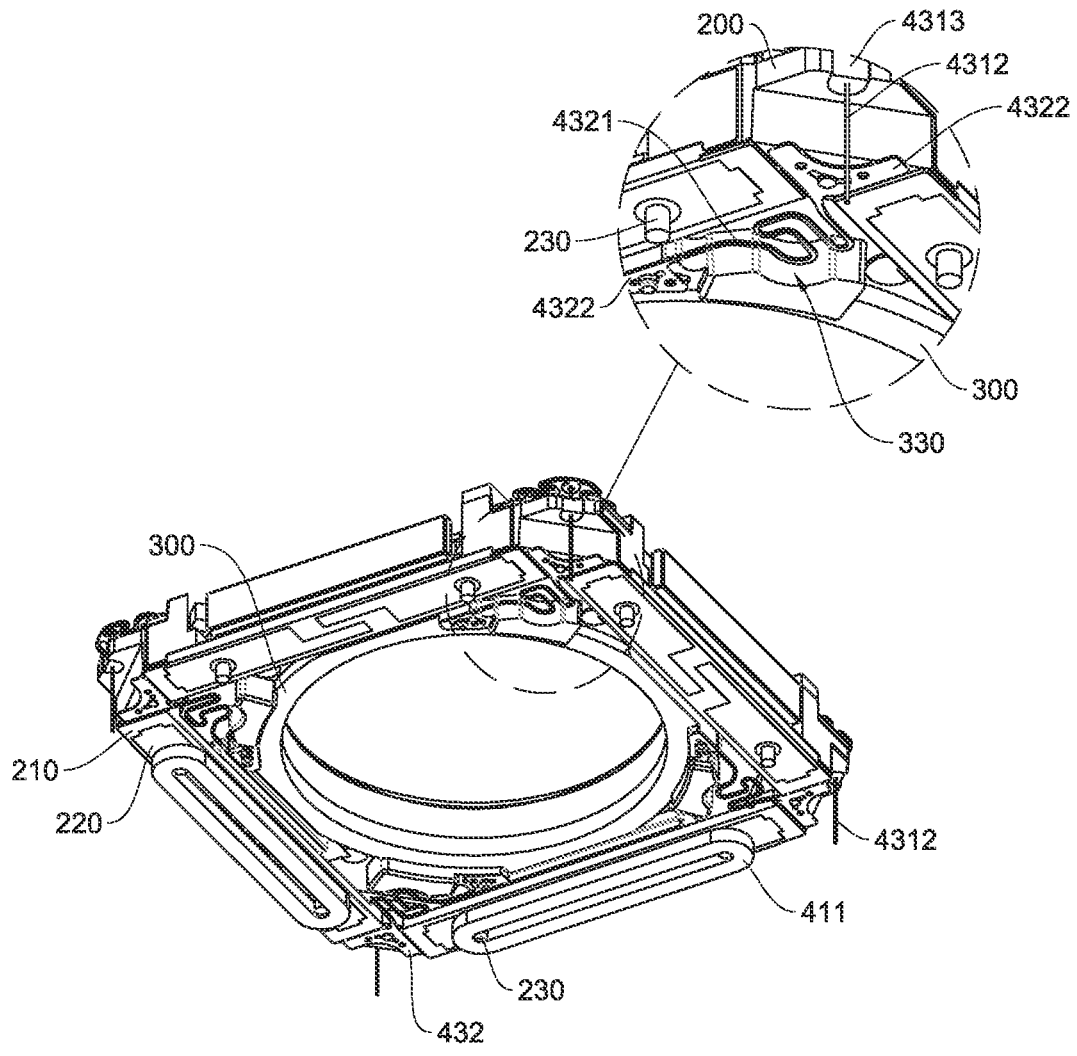
FIG. 7 is a schematic view of an internal structure of a lens module according to an embodiment of the present disclosure.

Specifically, referring to FIG. 7, the second reset member 432 includes a flexible connecting arm 4321 and at least two reset and fixing portions 4322 respectively connected to the flexible connecting arm 4321. The two reset and fixing portions 4322 are respectively connected to the lens barrel 300 and the support frame 200.

In the present embodiment, when the lens barrel 300 moves relative to the support frame 200, the flexible connecting arm 4321 can deform and store elastic potential energy. When the driving force of the focus assembly 410 is removed or the elastic force of the flexible connecting arm 4321 overcomes the force generated by the electronic device due to shaking, the flexible connecting arm 4321 can achieve the purpose of driving the lens barrel 300 to reset. When there are a plurality of flexible connecting arms 4321, each of the plurality of flexible connecting arms 4321 is connected to the reset and fixing portions 4322, the elastic acting force of the flexible connecting arms 4321 can be increased, thereby improving the reset effect of the flexible structure 4311. As shown in FIG. 7, in a preferred embodiment, an extension path of the flexible connecting arm 4321 is preferably of a curved surrounding structure to improve the deformation range and the reset effect of the flexible connecting arm 4321. Specifically, there may be other numbers of second reset members 432, such as, two second reset members 432, three second reset members 432, or four or more second reset members 432. The plurality of second reset members 432 are uniformly disposed along the circumferential direction of the lens barrel 300. By providing the plurality of second reset members 432 to be connected to the lens barrel 300 and the support frame 200, the focus reset effect and the reset stability of the focus assembly 410 can be improved.

Furthermore, the lens barrel 300 defines a fourth avoidance groove 330. The fourth avoidance groove 330 is defined on a side of the support frame 200 facing the flexible connection arm 4321. An orthographic projection of the flexible connection arm 4321 on the support frame 200 at least partially coincides with the fourth avoidance groove 330.

In this embodiment, by defining the fourth avoidance groove 330 on the lens barrel 300 to cooperate with the flexible connecting arm 4321, when the lens barrel 300 moves relative to the support frame 200, the fourth avoidance groove 330 can provide an avoidance for the flexible connecting arm 4321 to avoid collision between the lens barrel 300 and the second reset member 432, thereby improving the durability of the second reset member 432 and making the structure between the second reset member 432 and the support frame 200 and the lens barrel 300 more compact.

Figure 4:
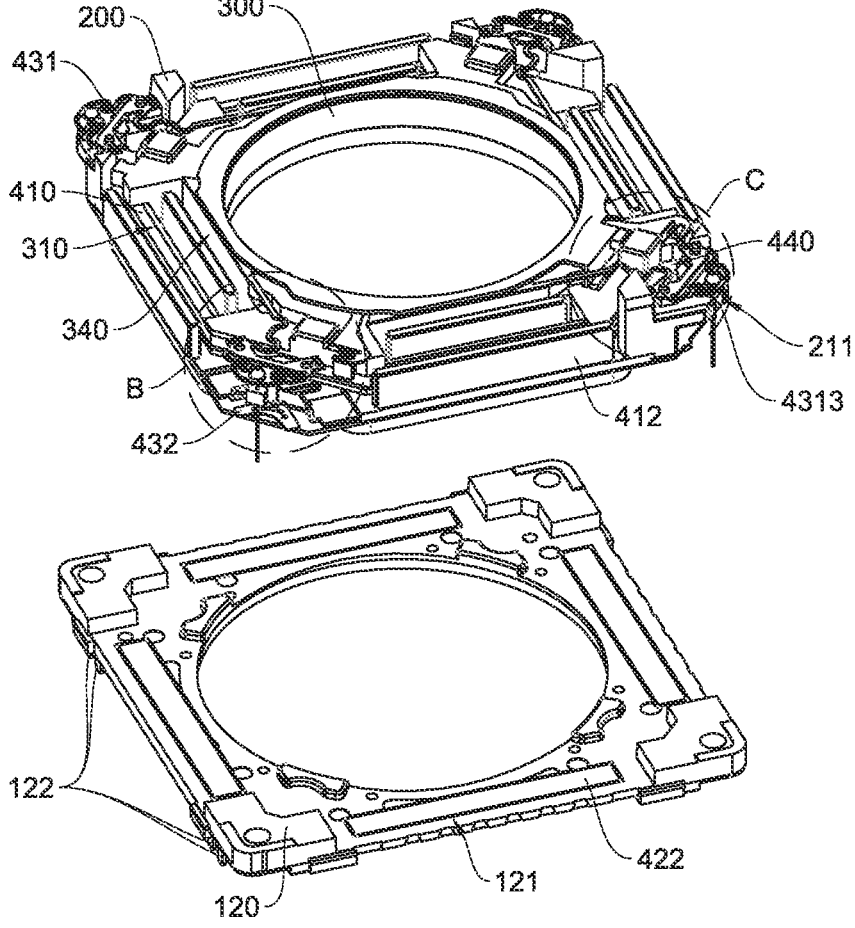
FIG. 4 is a partial structural explosion view of a lens module in an embodiment of the present disclosure.

Referring to FIGS. 4 to 6, in one embodiment, the support frame 200 defines a movable hole 211 penetrating the support frame 200. The suspension wire 4312 is inserted into the movable hole 211 and spaced apart from an inner wall of the movable hole 211.

It shall be understood that by enabling the movable hole 211 to cooperate with the suspension wire 4312, collision between the lens barrel 300 and the suspension wire 4312 in the deformation process can be avoided, so as to improve the durability of the suspension wire 4312. In addition, the combined structure between the suspension wire 4312 and the support frame 200 can be made more compact, which is convenient for realizing the miniaturization design requirement of the lens module 10.

Furthermore, the first reset member 431 further includes a damping filler 4313. The damping filler 4313 fills in the movable hole 211 and at least partially wraps the suspension wire 4312.

With such configuration, when the suspension wire 4312 is deformed or displaced with respect to the support frame 200, the damping filler 4313 can provide a damping effect for the suspension wire 4312, thereby providing a cushioning effect for the relative displacement between the support frame 200, the lens barrel 300, and the base 120.

Specifically, as shown in FIGS. 4 and 8, the frame body 210 defines a movable cavity 214 inside the frame body 210. The lens barrel 300 is suspended within the movable cavity 214. The lens barrel 300 defines a movable groove 340 connecting with the movable cavity 214. The bent portion 111 is inserted into the movable groove 340 and spaced apart from an inner wall of the movable groove 340.

In this embodiment, by defining the movable groove 340 on the lens barrel 300 to cooperate with the bent portion 111 of the upper shell 110, the overall structure between the upper shell 110 and the lens barrel 300 can be made more compact.

Referring to FIG. 3, in an embodiment, the at least one focus magnet 412 is configured as at least two focus magnets 412. Two focus magnets 412 are respectively arranged on opposite sides of the focus coil 411, and the two focus magnets 412 are respectively arranged on the bent portion 111 and the side wall 113. In some embodiments, merely one focus magnet 412 is provided, and the focus magnet 412 is connected to the side wall 113 and located outside the focus coil 411.

Referring to FIGS. 4, 7, and 8, the anti-shake assembly 420 includes at least one anti-shake coil 421 and at least one anti-shake magnet 422. The base 120 defines at least one accommodating groove 121. The at least one anti-shake magnet 422 is disposed at the bottom of the support frame 200. A respective one of the at least one anti-shake magnet 422 accommodated in a respective accommodating groove 121 of the at least one accommodating groove 121 and corresponding to a respective anti-shake coil 421 of the at least one anti-shake coil 421.

In the present embodiment, there may be at least two anti-shake coils 421. The two anti-shake coils 421 are cooperated with the two anti-shake magnets 422, respectively, to drive the support frame 200 to move in a X direction and a Y direction in a plane perpendicular to the optical axis of the lens barrel 300 to realize the anti-shake function. When the anti-shake assembly 420 is provided with a plurality of anti-shake coils 421, the plurality of anti-shake coils 421 may be connected through the anti-shake circuit board 423.

In one embodiment, a magnetic induction line direction of the respective anti-shake coil 421 is directed to or away from the respective anti-shake magnet 422. When the anti-shake coil 421 is energized, a magnetic force can be generated between the anti-shake coil 421 and the anti-shake magnet 422 to realize the function that the anti-shake assembly 420 drives the support frame 200 to move in the X direction and/or the Y direction.

Specifically, as shown in FIG. 7, the support frame 200 further includes at least one fixing column 230. The at least one fixing column 230 is provided at the bottom of the frame body 210. The respective anti-shake coil 421 is wound around a respective fixing column 230 of the at least one fixing column 230.

In the present embodiment, mounting and fixing between the anti-shake coils 421 and the frame body 210 can be facilitated by arranging the fixing columns 230 to cooperate with the anti-shake coils 421. It shall be understood that when each anti-shake coil 421 is configured with two fixing column 230, the anti-shake coil 421 may be sequentially wound around the two fixing columns 230 to form the anti-shake coil 421 having a cross section having, for example, a circular arc shape or a long arc shape.

Specifically, as shown in FIG. 5, each frame insert 220 includes an insert connecting part 221, an insert fixing part 222, and an insert middle part 223. The insert connecting part 221 and the insert fixing part 222 are respectively connected to two opposite sides of the insert middle part 223. The insert middle part 223 is bent from the insert fixing part 222 toward the first reset member 431. The insert connecting part 221 is at least partially extended from the frame body 210 and electrically connected with the first reset member 431. The insert fixing part 222 is at least partially exposed from the bottom of the frame body 210 and electrically connected with the anti-shake circuit board 423, thereby realizing circuit conduction between the focus assembly 410, the anti-shake assembly 420, the reset assembly 430, and the base 120.

In one embodiment, the base 120 has four base inserts 122. Each of the four base inserts 122 is electrically connected to a respective anti-shake coil of four anti-shake coils 421 and the focus coil 411 through a respective reset assembly 430 of four reset assemblies 430. In this embodiment, the focus assembly 410 is in parallel with an integrated circuit (IC) of each of the two anti-shake coils 421 of the anti-shake assembly 420 and is connected with the four base inserts 122. Two of the four base inserts 122 are used for power supply (VCC) and ground (GND), and the other two of the four base inserts 122 are used for transmitting control signals (including but not limited to analog signals and digital signals) to the two anti-shake coils 421 and the focus coil 411 respectively. With this configuration, the base 120 can be electrically connected to the external control circuits through the four base inserts 122, and the overall structure is compact, which facilitates the arrangement of the lens module 10 in the electronic device.

Furthermore, referring to FIG. 4, the adjusting mechanism 400 further includes a position sensing assembly 440. The position sensing assembly (i.e., position sensor) 440 is signally connected (electrically connected) to the base 120 and is configured to obtain a relative position between the lens barrel 300 and the support frame 200.

In one embodiment, the position sensing assembly 440 includes a sensing magnet 441 and a magnetic sensor 442. The sensing magnet 441 is magnetically cooperated with the magnetic sensor 442. One of the sensing magnet 441 and the magnetic sensor 442 is disposed on the lens barrel 300, and the other one of the sensing magnet 441 and the magnetic sensor 442 is disposed on the support frame 200.

With this arrangement, when the lens barrel 300 moves relative to the support frame 200, the magnetic sensor 442 acquires a change in the magnetic force signal of the sensing magnet 441 to judge the relative position of the lens barrel 300 and the support frame 200, thereby realizing the position feedback function of the adjusting mechanism 400. Specifically, the magnetic sensor 442 may be a Hall sensor. In other embodiments, the position sensing assembly 440 may also be an infrared sensor or other position sensors, which is not uniquely limited herein.

Specifically, as shown in FIGS. 4 and 8, the lens barrel 300 defines a mounting slot 310 on an outer circumferential wall of the lens barrel 300. The focus coil 411 is wound on the lens barrel 300 and accommodated in the mounting slot 310. The mounting slot 310 is at least partially located between the bent portion 111 and the side wall 113.

It shall be understood that by defining the mounting slot 310 on the lens barrel 300 to cooperate with the focus coil 411, the mounting convenience of the focus coil 411 can be improved, and in addition, a more compact structure can be made after both of them are assembled, so that the lens module 10 as a whole has a more compact structure.

The disclosure also provides an electronic device. The electronic device includes a host device and the lens module 10 described in any of the above embodiments, where the lens module 10 is arranged in the host device.

It shall be understood that in the electronic device of the present embodiment, by providing the lens module 10 in any of the above-mentioned embodiments, the lens module 10 can make full use of the internal space of the upper shell 110 to make the structure between the focus assembly 410 and the upper shell 110 more compact by employing the bent portion 111 spaced apart from the side wall 113 to cooperate with the focus coil 411, thereby making the overall structure of the lens module 10 more compact and facilitating arrangement in the electronic device. In addition, the power supply and signal transmission functions of the lens module 10 can be realized by using the reset assembly 430 to be electrically connected with the focus assembly 410 and the anti-shake assembly 420, and the purpose of optimizing the internal structure of the lens module 10 can be further achieved. Specifically, the electronic device includes, but is not limited to, a tablet computer, and a smart phone.

In the description of embodiments of the disclosure, it is to be noted that orientation or positional relationships indicated by the terms "center," "longitudinal," "transverse," "upper," "lower," "front," "rear," "left," "right," "vertical," "horizontal," "top," "bottom," "inner," "outer" and the like are orientation or positional relationships shown in the drawings, which are intended for ease of description and simplification of the embodiment of the disclosure only, and are not intended to indicate or imply that the device or element in question must have a particular orientation, be constructed and operate in a particular orientation and therefore should not be construed as limiting to the embodiment of the disclosure. Furthermore, the terms "first", "second", and "third" are used for descriptive purposes only and should not be understood to indicate or imply relative importance.

In the description of embodiments of the present disclosure, it is to be noted that unless otherwise expressly specified and limited, the terms "connecting/connected" and "coupling" should be understood in a broad sense, for example, they may be fixed connections, detachable connections, or integral connections. Alternatively, they may be understood as mechanical connection or electrical connection; or can be directly connection or indirectly connection through an intermediary. The particular meaning of the above terms in the embodiments of the present disclosure can be understood in particular to those of ordinary skill in the art.

In embodiments of the disclosure, the first feature being "above" or "below" the second feature may be in direct contact with the first feature and the second feature, or the first feature and the second feature may be in indirect contact through an intermediate medium, unless otherwise expressly specified and defined. Moreover, the first feature being "above", "on", and "upper" the second feature may mean that the first feature is directly above or obliquely above the second feature, or simply indicate that the first feature is horizontally higher than the second feature. The first feature is "below", "under", and "beneath" the second feature, may mean that the first feature is directly below or obliquely below the second feature, or simply mean that the horizontal height of the first feature is less than that of the second feature.

In the description of this specification, descriptions of the reference terms "one embodiment," "some embodiments," "example," "specific example," or "some examples," etc. mean that specific features, structures, materials, or features described in connection with the embodiments or examples are included in at least one embodiment or example of an embodiment of the disclosure. In this specification, the schematic formulation of the above terms need not be directed to the same embodiments or examples. Further the specific features, structures, materials, or characters described may be combined in a suitable manner in any one or more embodiments or examples. Furthermore, without contradicting, one another those skilled in the art may combine different embodiments or examples described in this specification and features of different embodiments or examples.

Finally, it is to be noted that the above embodiments are only used to illustrate the technical scheme of the present disclosure, but not to limit it. Although the present disclosure has been described in detail with reference to the foregoing embodiments, it is to be understood by those of ordinary skill in the art that the technical scheme described in the foregoing embodiments can still be modified or some technical features thereof can be equivalently replaced. These modifications or substitutions do not depart the essence of the corresponding technical proposal from the spirit and scope of the technical proposal of the embodiments of the present disclosure.

What is claimed is:

1. A lens module, comprising:
a bearing structure including an upper shell and a base that are connected with each other, wherein the upper shell includes a bent portion, a middle portion, and a side wall that are connected in sequence, wherein the side wall is spaced apart from the bent portion, and the base is configured to be electrically connected with an external circuit;
a support frame suspended inside the bearing structure;
a lens barrel suspended inside the support frame; and
an adjusting mechanism including a focus assembly, an anti-shake assembly, and a reset assembly, wherein the focus assembly includes a focus coil and at least one focus magnet, the focus coil is wound on the lens barrel and suspended between the bent portion and the side wall, and a respective focus magnet of the at least one focus magnet is at least partially arranged on a side of the side wall facing the focus coil, wherein the anti-shake assembly is connected to the base and the support frame, and the reset assembly is connected to the bearing structure, the support frame, and the lens barrel, and is electrically connected to the focus assembly and the anti-shake assembly.

2. The lens module of claim 1, wherein the reset assembly includes a first reset member, the first reset member includes a flexible structure and a suspension wire, the flexible structure is connected to the lens barrel and the support frame, and the support frame is electrically connected to the focus coil and the anti-shake assembly, wherein the suspension wire is connected with the flexible structure and the base, and the suspension wire is electrically connected with the base.

3. The lens module of claim 2, wherein the flexible structure includes at least one first flexible arm and at least two first connecting portions, wherein the two first connecting portions are respectively connected to the lens barrel and the support frame, each of the at least one first flexible arm is connected to the at least two first connecting portions, and the suspension wire has an end connected and electrically connected with one of the at least two first connecting portions and has another end connected and electrically connected with the base.

4. The lens module of claim 3, wherein the lens barrel defines at least one first avoidance groove, a respective first avoidance groove of the at least one first avoidance groove is defined on a side of the lens barrel facing a respective first flexible arm of the at least one first flexible arm, and an orthographic projection of the respective first flexible arm on the lens barrel at least partially coincides with the respective first avoidance groove.

5. The lens module of claim 4, wherein the support frame defines at least one second avoidance groove, a respective second avoidance groove of the at least one second avoidance groove is arranged on a side of the support frame facing the respective first flexible arm, and an orthographic projection of the respective first flexible arm on the support frame at least partially coincides with the respective second avoidance groove.

6. The lens module of claim 3, wherein the flexible structure further comprises at least one second flexible arm and a second connecting portion, wherein a respective second flexible arm of the at least one second flexible arm is connected to the second connecting portion and the respective first connecting portion, and the second connecting portion is connected with an end of the suspension wire away from the base.

7. The lens module of claim 6, wherein the support frame defines at least one third avoidance groove, a respective third avoidance groove of the at least one third avoidance groove is defined on a side of the support frame facing the respective second flexible arm, and an orthographic projection of the respective second flexible arm on the support frame at least partially coincides with the respective third avoidance groove.

8. The lens module of claim 2, wherein the reset assembly further comprises a second reset member, the second reset member is connected to the lens barrel and the support frame, and the second reset member is disposed at a side of the support frame away from the first reset member.

9. The lens module of claim 8, wherein the second reset member includes a flexible connecting arm and at least two reset and fixing portions, wherein the at least two reset and fixing portions are respectively connected to the flexible connecting arm, wherein the two reset and fixing portions are respectively connected to the lens barrel and the support frame.

10. The lens module of claim 8, wherein the lens barrel defines a fourth avoidance groove, the fourth avoidance groove is defined on a side of the support frame facing the flexible connecting arm, and an orthographic projection of the flexible connecting arm on the support frame at least partially coincides with the fourth avoidance groove.

11. The lens module of claim 2, wherein the support frame defines a movable hole penetrating the support frame, the suspension wire is inserted into the movable hole and spaced apart from an inner wall of the movable hole.

12. The lens module of claim 11, wherein the first reset member further comprises a damping filler, and the damping filler fills in the movable hole and at least partially wraps the suspension wire.

13. The lens module of claim 1, wherein the frame body defines a movable cavity inside the frame body, and the lens barrel is suspended in the movable cavity, wherein the lens barrel defines a movable groove connecting with the movable cavity, and the bent portion is inserted into the movable groove and spaced apart from an inner wall of the movable groove.

14. The lens module of claim 1, wherein the at least one focus magnet is configured as one focus magnet, and the one focus magnet is connected to the side wall and disposed outside the focus coil; or
wherein the at least one focus magnet is configured as at least two focus magnets, wherein the two focus magnets are respectively arranged on opposite sides of the focus coil, and the two focus magnets are respectively arranged on the bent portion and the side wall.

15. The lens module of claim 1, wherein the anti-shake assembly includes at least one anti-shake coil and at least one anti-shake magnet, the base defines at least one accommodating groove, the at least one anti-shake coil is arranged at the bottom of the support frame, and a respective anti-shake magnet of the at least one anti-shake magnet is accommodated in a respective accommodating groove of the at least one accommodating groove and corresponding to a respective anti-shake coil of the at least one anti-shake coil.

16. The lens module of claim 1, wherein the adjusting mechanism further comprises a position sensing assembly, the position sensing assembly is electrically connected to the base, and the position sensing assembly is configured to obtain a relative position between the lens barrel and the support frame.

17. The lens module of claim 16, wherein the position sensing assembly includes a sensing magnet and a magnetic sensor, and the sensing magnet is magnetically cooperated with the magnetic sensor, wherein one of the sensing magnet and the magnetic sensor is disposed on the lens barrel, and another of the sensing magnet and the magnetic sensor is disposed on the support frame.

18. The lens module of claim 1, wherein the lens barrel defines at least one mounting slot on an outer circumferential wall of the lens barrel, the focus coil is wound on the lens barrel and accommodated in the mounting slot, and the mounting slot is at least partially located between the bent portion and the side wall.

19. An electronic device, comprising:

a host device; and a lens module, wherein the lens module is arranged in the host device; wherein the lens module includes:

a bearing structure including an upper shell and a base that are connected with each other, wherein the upper shell includes a bent portion, a middle portion, and a side wall that are connected in sequence, wherein the side wall is spaced apart from the bent portion, and the base is configured to be electrically connected with an external circuit;

a support frame suspended inside the bearing structure;

a lens barrel suspended inside the support frame; and an adjusting mechanism including a focus assembly, an anti-shake assembly, and a reset assembly, wherein the focus assembly includes a focus coil and at least one focus magnet, the focus coil is wound on the lens barrel and suspended between the bent portion and the side wall, and a respective focus magnet of the at least one focus magnet is at least partially arranged on a side of the side wall facing the focus coil, wherein the anti-shake assembly is connected to the base and the support frame, and the reset assembly is connected to the bearing structure, the support frame, and the lens barrel, and is electrically connected to the focus assembly and the anti-shake assembly.

20. The electrical device of claim 19, wherein the reset assembly includes a first reset member, the first reset member includes a flexible structure and a suspension wire, the flexible structure is connected to the lens barrel and the support frame, and the support frame is electrically connected to the focus coil and the anti-shake assembly, wherein the suspension wire is connected with the flexible structure and the base, and the suspension wire is electrically connected with the base.

* * * * *